May 5, 1936.  F. E. TUTTLE  2,039,691

PHOTOGRAPHIC PRINTING APPARATUS

Filed Nov. 18, 1933  2 Sheets-Sheet 1

Inventor:
Fordyce E. Tuttle,

By
Attorneys

May 5, 1936.  F. E. TUTTLE  2,039,691
PHOTOGRAPHIC PRINTING APPARATUS
Filed Nov. 18, 1933   2 Sheets-Sheet 2
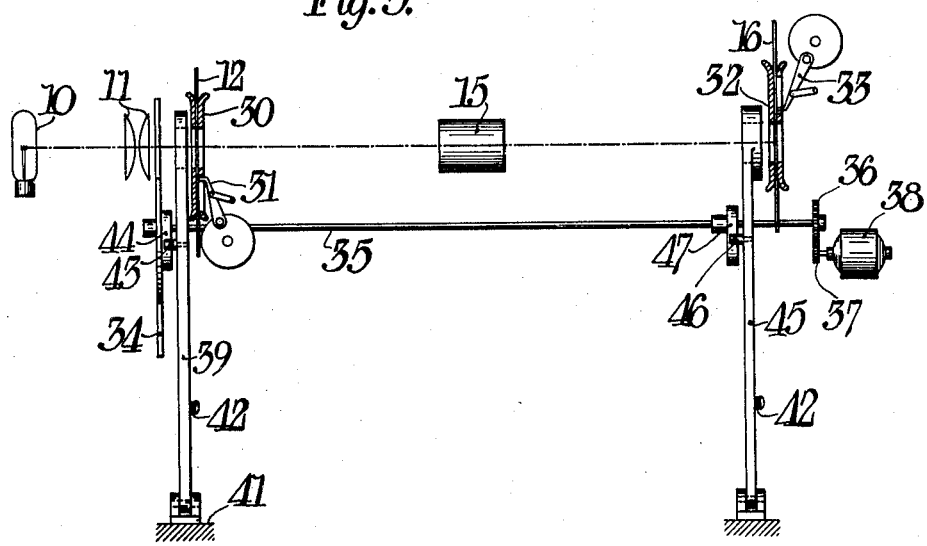
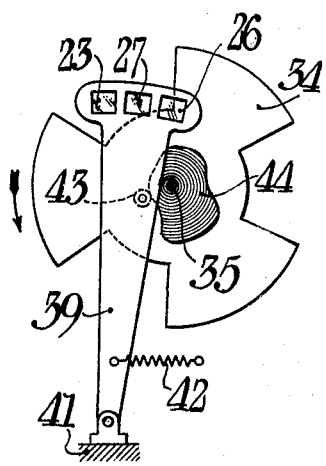
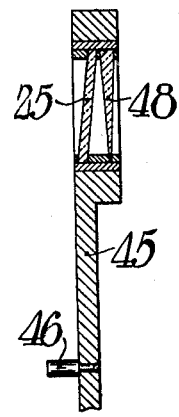
Inventor:
Fordyce E. Tuttle, Patented May 5, 1936

2,039,691

UNITED STATES PATENT OFFICE 2,039,691

PHOTOGRAPHIC PRINTING APPARATUS

Fordyce E. Tuttle, Rochester, N. Y., assignor to Eastman Kodak Company, Rochester, N. Y., a corporation of New York Application November 18, 1933, Serial No. 698,650

4 Claims. (Cl. 88—24)

My present invention relates to photography and more particularly to the copying or duplicating of goffered film by projection printing.

In the printing of goffered or lenticular film it has been difficult to obtain prints of satisfactory definition and good color rendition due to a number of causes including color wedging and lack of color separation. As set forth in my previous application, Serial Number 656,685 filed February 14, 1933 I have disclosed and claimed a method and apparatus for overcoming the most serious of these difficulties by printing the color separation images separately and successively.

In accordance with the present invention, I print the color separation images separately and successively but instead of using a printing objective having the required large aperture, usually f. 2.0, an objective having a relatively small aperture may be used inasmuch as the improved method and apparatus of the present invention requires only that the printing objective subtend an angle equal to the apparent angle subtended by a single filter area, which in practice is usually f. 8.0. An objective working at this aperture, f. 8.0, can be better corrected than one having a much larger aperture and accordingly improve considerably the quality of the printed image.

In the present invention I employ a single source of light which preferably is linear and spaced from the condenser so that the angle subtended by the source at the condenser is less than the angle subtended by a single filter band used in the process, generally at present, an angle whose tangent is one-eighth. This source of light is made to appear successively in three different angular positions corresponding to the filter bands positions by means of a mirror or prism arrangement. When the light source appears on the optical axis the lens working at f. 8.0 subtends only the angle of the central filter band and therefore only the central color (green) is printed. When the light source is made to appear off the axis, the light to the lens is limited to light from one of the "off axis" colors (the red or the blue). In each case the objective lens is made to appear at infinity to the copy film by means of a compensating lens and for the off axis color the light is directed onto the copy film by means of a compensating lens and for the off axis color the light is directed onto the copy film at angle corresponding to the color component image illuminated on the original film. Since each component image is printed separately the printing may be done at an altered scale by adjusting the position of the objective, the gate to gate distance, and the focal length of the compensating lens in front of the copy film.

The novel features which I believe to be characteristic of my invention are set forth with particularity in the appended claims. My invention itself however both as to its apparatus and method of operation will best be understood by reference to the following description taken in connection with the accompanying drawings in which:

Fig. 5 is a sectional side elevation of an apparatus suitable for effecting the printing of a series of pictures;

Fig. 6 is an elevation of a suitable prism carrier and cooperating shutter; and

Fig. 7 is a sectional view of a part of the prism carrier shown in Fig. 6.

In order that my invention may be readily understood the underlying principles will be explained with reference to Figs. 1 and 2 after which a practical embodiment of the invention incorporating these principles will be described.

Figure 1:
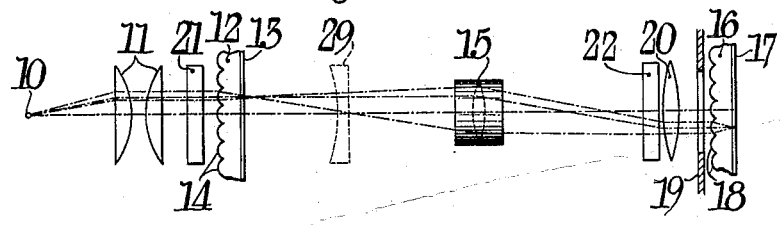
Fig. 1 is a diagrammatic view illustrating an optical arrangement for printing the central color components.

An optical arrangement for printing the central color component, usually the green, is diagrammatically shown in Fig. 1 as comprising a linear light source 10, the light from which is concentrated by condenser lenses 11 onto a film 12 carrying a developed image 13 and provided with cylindrical lenticulations 14 the axes of which are parallel to the axis of the linear light source 10. The illuminated image layer 13 is imaged by an objective lens 15 on a raw or copy film 16 provided with a sensitive layer 17 and cylindrical lenticulations 18 which are parallel to the embossings 14 carried by the original film 12. A suitable window 19 may be provided for framing the image on the sensitive film 16. In order to make the objective 15 appear at infinity to the sensitive film 16 a thin compensating lens 20 is positioned in close proximity to the gate 19. If the compensating lens 20 is made cylindrical its axis should be parallel to the axis of the embossings 14 on the sensitive film 16. Two plane parallel glass plates 21 and 20 are positioned in front of the films 12 and 16 respectively to shorten the optical path for the purpose which will hereinafter appear.

The manner in which the central color component, green of the film 12 alone is printed by the arrangement shown in Fig. 1 will now be described. The source 10 is spaced from the condenser 11 so that the useful angle of light is less than the angle of the green filter band used in taking which in present practice is approximately an angle whose tangent is one-eighth. By this arrangement it is insured that only the green component is illuminated and therefore only light corresponding to the green is received by the printing objective 15. Since the objective is working at f. 8.0 it subtends on the sensitive film 16 only the angle corresponding to the central filter band and therefore only the central component is printed on the sensitive film.

Figure 2:
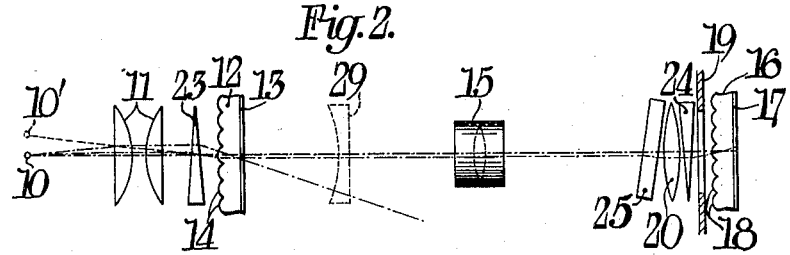
Fig. 2 shows the arrangement of Fig. 1 as modified for printing an off axis color component.

For printing an off axis color component, the red or the blue, the arrangement shown in Fig. 1 is modified as shown in Fig. 2 to illuminate only the off axis component. This may be done by positioning in front of the film 12 a thin prism 23 causing the light source 10 to appear to the film 12 to be off the axis at 10'. The angle of the prism 23 should be such that the light falling on the film 12 will be directed by the lens elements 14 onto one of the off axis color component images which will be assumed to be the red. An angle of approximately 14 degrees has been found suitable for the prism 23. It is thus seen that only the red color component is illuminated and therefore the light collected by the objective 15 will represent the red only and if properly directed upon the sensitive layer 17 of the raw film 16 will print the red component.

To direct the light onto the film 16 at the proper angle a thin prism 24 is positioned between the compensating lens 20 and the film 16 and inverted relatively to the prism 23 so that the portion of the layer 17 exposed will bear the same relative position to the image as inverted by the objective 15 as it does in the original image layer 13. The introduction of the prism 24 into the optical system displaces the image formed on the raw film 16 and in order to compensate for this displacement an equal and opposite displacement is introduced by means of a plane parallel glass plate 25 inclined at a small angle to the perpendicular of the optic axis. The size of this angle will of course depend upon the thickness and the refractive index of the glass used in the plate 25. The presence of the prism 23 and the plate 25 and the prism 24 in the optical path alters its effective length and in order that this length may be constant an equivalent shortening of the light path is obtained for printing the central color or green by the provision of plane plates 21 and 22 placed perpendicularly to the optic axis as shown in Fig. 1.

The printing of the other off axis color component, the blue, is identical in principle to the printing of the red and needs no more explanation than to state that all that is necessary is to invert the prism 23 and the plate 25 and the prism 24.

Figure 3:
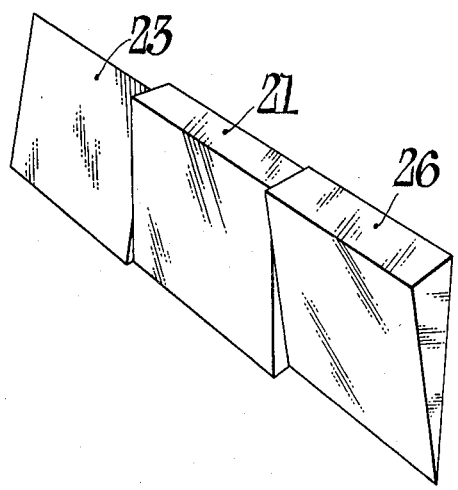
Fig. 3 is a perspective view of a series of prisms which may be used for properly directing the light onto the two films.

For convenience in manipulating the prisms and plane plates they may be assembled as shown in Fig. 3 so that the three exposures necessary for each frame may be made by positioning the prism 23, the plate 21 and the prism 26 in the optical path in front of the original film 12 and simultaneously but in the reverse order positioning similar elements in front of the raw film 16 together with inclined plane plates to compensate for the image displacement introduced by the prism element.

Figure 4:
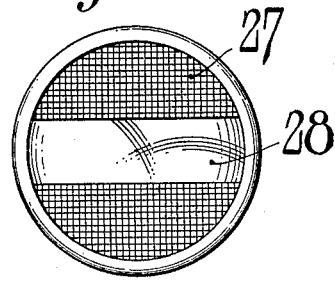
Fig. 4 shows a mask which may be used if an f. 2.0 lens is employed.

Instead of using a lens working at f. 8.0 for the objective 15 an f. 2.0 lens may be used if it is provided with a mask 27 such as is shown in Fig. 4 having a banded opening 28 parallel to the embossed lenses 18 on the raw film 16 and of a width such that the angle subtended on the raw film 16 is not greater than the angle to be subtended by a single filter band in subsequent projection of the film.

If a lens working at f. 8.0 is used for the printing objective the quality of the print may be improved by inserting between the original film 12 and the objective 15 a weak negative cylindrical lens 29 such as an ordinary spectacle lens with power enough to spread one embossed lens over two embossed lenses and thereby prevent the formation of a moiré pattern in the printed film 16. The same beneficial result would follow from the use of the lens 29 in conjunction with an f. 2.0 printing objective were it not that most lenses of this aperture are so poorly corrected that such use is unsatisfactory.

The optical principles involved in my invention having been explained, an apparatus in which one embodiment of the invention is incorporated will now be described in connection with Fig. 5 in which is shown a gate 30 through which the original film 12 is adapted to be intermittently advanced by a suitable pull-down device 31 and an exposure gate 32 through which the copied film 16 is intermittently advanced by a pull-down device 33. As indicated by the arrow the films 12 and 16 are advanced in opposite directions so that the inversion of the image by the objective 15 will not affect the arrangement of the successive frames on the copy film 16.

As best shown in Fig. 6 the three separate exposures for each frame as above explained may be obtained by means of the three-bladed shutter 34 mounted on a shaft 35 which is adapted to be rotated through gears 36 and 37 by a suitable motor 38. The shutter 34 is positioned so that upon being rotated it periodically interrupts the illumination of the film 12 in the gate 30 and is synchronized with the pull-down devices 31 and 33 in such a manner that the two films 12 and 16 are advanced one frame for each complete revolution of the shutter 34. Suitable mechanism for thus interconnecting the shutter 34 and the pull-down devices 31 and 33 will immediately suggest itself to anyone skilled in this art and is not here shown since it would tend to obscure rather than to make plain the present invention. The prisms 23 and 26 and the plane plate 21 for controlling the direction of the light illuminating the film 12 may be mounted in an arm 39 pivoted in a support 40 carried by any suitable part 41 of the base or frame of the apparatus. A coiled spring 42 serves to bias the arm 39 to the right as viewed in Fig. 6 and a cam follower 43 carried by the arm 39 and riding on the surface of a cam 44 secured to the shaft 35 serves to force the arm 39 to the left against the tension of the spring 42. As is clearly shown in Fig. 6 the cam 44 is provided with three segments which are arcs of circles having a common center coincident with the axis of the cam 44. These circular segments are spaced angularly so that no movement of the arm 39 occurs during the periods the open sections of the shutter 34 are in alignment with one of the optical elements 21, 23 or 26. In other words the successive movements of the arm 39 caused by non-circular segments of the cam 44 occur during the period the light is interrupted by the shutter blades. It is now clear that upon one complete rotation of the shaft 35 a single frame of the original film 12 will be illuminated successively by light transmitted by the elements 23, 21, and 26 with intervening periods of darkness during which the non-circular segments operate to shift the next succeeding glass element into position between the light source 10 and the film gate 30.

A similar arrangement including a pivoted arm 45 provided with a follower 46 for a cam 47 having an equivalent contour to the cam 44 is provided for successively positioning the prisms and plates in front of the exposure gate 32.

The apparatus above described will successively print three color components of a single frame as described in connection with Figs. 1 and 2 after which and during a dark period the two films 12 and 16 are advanced a frame and the operation is repeated.

An inspection of Fig. 2 will disclose that the central ray of the cone of light emerging from the image layer behind each embossed lens of the original film 12 does not reach the objective 15 as did the central ray in printing the green color in Fig. 1. This means that in printing the green a greater proportion of the light is collected by the objective 15 than in printing the red and blue and to compensate for this difference in intensity the exposure time in printing the green is made smaller than for the other two color components by correspondingly making smaller the angle of the open shutter sector as shown in Fig. 6.

The prism 24 and compensating lens 20 shown in Fig. 2 may if desired be replaced by a decentered compensating lens 48 as shown in Fig. 7.

If it is desired to print from films having transverse lenticulations onto film provided with longitudinal lenticulations or vice versa it is necessary only to arrange the prism elements with their refractive angles lying in a plane perpendicular to the axes of the embossed lens of the adjacent film. Of course if it is the copy film 16 which is provided with longitudinal embossings it will be necessary to rotate correspondingly the inclined plate 25.

In the practice of my invention each color component image is printed separately and the angle subtended by the filter in taking the original is independent of the angle subtended in projecting the copy film. This being true, all that is necessary to print on an altered scale is to change the position of the objective 15, the gate to gate distance, and select compensating lenses having the proper focal length for directing the light onto the raw or copy film. Another advantage arising from the independence of the filter angles in taking the original and projecting the copy film is that it makes possible the taking of the original film with a lens of small aperture.

For the purpose of explaining my invention in detail I have described it as applied to the printing of goffered film bearing three color separation images. However, it is obviously equally applicable to the printing of goffered film bearing two separated images and these images may correspond to two stereoscopic views as well as to separation images of a two-color process. In fact, my invention contemplates the duplication of a goffered film regardless of the nature of the image or images carried thereby. Various modifications of my invention will readily suggest themselves to persons skilled in the art without departing from the scope of my invention as set forth in the appended claims.

What I claim as new and desire to secure by Letters Patent of the United States is:

1. An optical printer for duplicating a film provided with cylindrical lenticulations and carrying color separation images in registration with the lenticulations, including a linear source of light, means for supporting the original film with its lenticulations facing and parallel to the source of light, a condenser between said light source and the original film for giving the source an apparent width as viewed from the original not greater than the apparent width of a single filter band of the polychromatic screen used in taking the original, whereby only a single color separation image on the original will be illuminated, means for shifting the angle of incidence of the light on the original for selectively illuminating each of the color separation images on the original, an objective positioned to collect the light transmitted by the original, means for supporting a copy film in the image plane of the objective and with its lenticulations facing the incident light, the angle subtended by the exit pupil of the objective on the copy film in the plane perpendicular to the axes of its cylindrical lenticulations being no greater than the angle to be subtended by a single band of the filter to be used in projecting the copy film and light deflecting means separately movable into position in front of the copy film for altering the apparent position of the exit pupil of the objective as viewed from the copy film.

2. An optical system for printing by projection color separation images on a sensitive film provided with cylindrical lenticulations from an original film provided with similar lenticulations, which comprises means for selectively illuminating in succession each separation image on the original film, an objective having an axial aperture for imaging on the sensitive film the picture carried by the original film, diaphragming means for limiting the aperture of the objective in a direction perpendicular to the lenticulations on the sensitive film to subtend on the sensitive film an angle approximately equal to the angle subtended by a single filter band to be used in projecting the copy film and light deflecting means movable into the optical path between said objective and said sensitive film for directing at an angle the light falling on the sensitive film when an "off axis" separation image on the original is illuminated.

3. An optical printer for use in a color process in which the original and the record to be printed each includes an image layer carried by a support having cylindrical lenticulations, including means for separately and successively illuminating limited portions of the image layer on the original, an objective for imaging the original on the record to be printed and a series of light deflecting means separately movable into the light beam between the objective and the record to be printed for directing the image bearing light to portions of the sensitive layer on the record to be printed corresponding to the limited portions of the original image layer illuminated.

4. An optical printer for use in printing color separation images on a sensitive film provided with cylindrical lenticulations from an original film provided with similar lenticulations comprising a source of light, means for supporting the original film with its lenticulations facing said source, means for limiting the apparent width of said source in a direction perpendicular to the lenticulations on the original film to subtend on the original film an angle not greater than the angle subtended by a single band of the filter used in taking the original film, means for selectively and separately making said source occupy the apparent positions occupied by the several filter bands in taking, whereby each color separation image on the original film is selectively and separately illuminated, an objective for imaging the original film upon the sensitive film, and light deflecting means between the objective and the sensitive film for selectively controlling the angle at which the light is incident upon said sensitive film, whereby an objective may be used having an aperture which is numerically not greater than the reciprocal of the tangent of the angle subtended by a single filter band used in taking the original.

FORDYCE E. TUTTLE.